US010667068B2

(12) United States Patent
Long et al.

(10) Patent No.: US 10,667,068 B2
(45) Date of Patent: May 26, 2020

(54) SEAMLESSLY JOINING SIDES OF A SPEAKER ENCLOSURE

(71) Applicant: Sonos, Inc., Santa Barbara, CA (US)

(72) Inventors: Nicholas Long, Santa Barbara, CA (US); Brandon Holley, Brookline, MA (US); Sivarupan Sivasubramaniam, Boston, MA (US)

(73) Assignee: Sonos, Inc., Santa Barbara, CA (US)

(*) Notice: Subject to any disclaimer, the term of this patent is extended or adjusted under 35 U.S.C. 154(b) by 247 days.

(21) Appl. No.: 15/283,250

(22) Filed: Sep. 30, 2016

(65) Prior Publication Data
US 2018/0098168 A1 Apr. 5, 2018

(51) Int. Cl.
H04R 31/00 (2006.01)
B29C 45/14 (2006.01)
B29L 31/34 (2006.01)
H04R 1/02 (2006.01)
(Continued)

(52) U.S. Cl.
CPC ..... H04R 31/006 (2013.01); B29C 45/14336 (2013.01); B29C 45/14467 (2013.01); H04R 1/023 (2013.01); B29C 45/0053 (2013.01); B29C 45/14065 (2013.01); B29C 2045/0058 (2013.01); B29C 2045/1495 (2013.01); B29L 2031/3418 (2013.01); H04R 27/00 (2013.01); H04R 2201/029 (2013.01); H04R 2227/003 (2013.01); H04R 2227/005 (2013.01); H04R 2420/07 (2013.01)

(58) Field of Classification Search
CPC ........................ H04R 31/006; B29C 45/14336
USPC ........................................................ 264/263
See application file for complete search history.

(56) References Cited

U.S. PATENT DOCUMENTS 2,115,098 A * 4/1938 Engholm ............... H04R 1/021
181/150
3,938,618 A * 2/1976 Ambruoso, Sr. ...... H04R 1/023
181/155
(Continued)

FOREIGN PATENT DOCUMENTS

EP 2866462 A2 * 4/2015 .......... F21V 33/0056
WO WO-2015085789 A1 * 6/2015 ............... H04R 9/06

OTHER PUBLICATIONS

Machine translation of EP 2866462 (Year: 2015).*

Primary Examiner — Peter L Vajda
Assistant Examiner — Russell E Sparks
(74) Attorney, Agent, or Firm — KPPB LLP

(57) ABSTRACT

A method for joining sides of a speaker enclosure includes affixing a speaker grill element to a substructure element, where the speaker grill element has a depth that is shorter than its length and width, includes a first surface and a second surface parallel to each other, and includes hole openings, where the substructure element has a depth that is shorter than its length and width, includes protrusions above its front surface, and includes openings larger than the openings in the speaker grill element, and where the speaker grill element is aligned lengthwise to a first plane, inserting the joined speaker grill element and substructure element into a mould, where in combination with portions of the speaker grill element and the substructure element, a surface of the mould forms a mould cavity, and injecting molten plastic into the mould cavity to form an injection moulded side element.

15 Claims, 17 Drawing Sheets

(51) Int. Cl.
*B29C 45/00* (2006.01)
*H04R 27/00* (2006.01)

(56) References Cited

U.S. PATENT DOCUMENTS

| | | | | |
|---|---|---|---|---|
| 4,032,725 | A | * | 6/1977 | McGee .................. H04R 1/025 |
| | | | | 248/27.1 |
| 4,503,292 | A | * | 3/1985 | Johnson ................. H04R 1/023 |
| | | | | 381/391 |
| 5,623,133 | A | * | 4/1997 | Kurihara ............. B29C 45/0046 |
| | | | | 181/150 |
| 5,717,171 | A | * | 2/1998 | Miller .................... H04R 1/023 |
| | | | | 181/150 |
| 8,234,395 | B2 | | 7/2012 | Millington |
| 8,632,711 | B2 | * | 1/2014 | Mundt .............. B29C 45/14467 |
| | | | | 264/263 |
| 9,838,816 | B2 | * | 12/2017 | Wang ....................... H04R 9/06 |
| D827,671 | S | | 9/2018 | Nam et al. |
| D851,057 | S | | 6/2019 | Nam |
| 2008/0119244 | A1 | * | 5/2008 | Malhotra ............ B29C 45/0053 |
| | | | | 455/575.1 |
| 2010/0203929 | A1 | | 8/2010 | Skagmo |
| 2017/0028438 | A1 | * | 2/2017 | Leggett ................... B32B 37/24 |
| 2017/0055066 | A1 | | 2/2017 | Chamness et al. |
| 2018/0098140 | A1 | | 4/2018 | Nam et al. |
| 2018/0207846 | A1 | * | 7/2018 | Sutter .............. B29C 45/14065 |

* cited by examiner

US 10,667,068 B2

SEAMLESSLY JOINING SIDES OF A SPEAKER ENCLOSURE

FIELD OF THE DISCLOSURE

The disclosure is related to consumer goods and, more particularly, to methods, systems, products, features, services, and other elements directed to manufacturing or creation of a media playback device or some aspect thereof. Media playback devices and associated features and capabilities can include those disclosed in U.S. patent application Ser. No. 29/579,640 entitled "Media Playback Device," filed Sep. 30, 2016, U.S. patent application Ser. No. 29/579,643 entitled "Speaker Grill with Graduated Hole Sizing over a Transition Area for a Media Device," filed Sep. 30, 2016, U.S. patent application Ser. No. 15/283,243 entitled "Speaker Grill with Graduated Hole Sizing over a Transition Area for a Media Device," filed Sep. 30, 2016, and U.S. patent application Ser. No. 14/831,903 entitled "Manipulation of Playback Device Response Using an Acoustic Filter," the disclosure from which relevant to media playback devices is hereby incorporated by reference in its entirety.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience. Home audio loudspeakers and playback devices that include integrated speakers have outer enclosures that can be made of a variety of materials, such as plastic, wood, or fiberboard. The enclosures are typically constructed of a number of individual pieces and the joints where the pieces meet may be visible as a seam, often at the corners of the speaker.

BRIEF DESCRIPTION OF THE DRAWINGS

Features, aspects, and advantages of the presently disclosed technology may be better understood with regard to the following description, appended claims, and accompanying drawings where:

FIG. 8D illustrates an example showing a substructure element behind a speaker grill element in accordance with embodiments of the invention.

DETAILED DESCRIPTION

I. Overview

Figure 1:
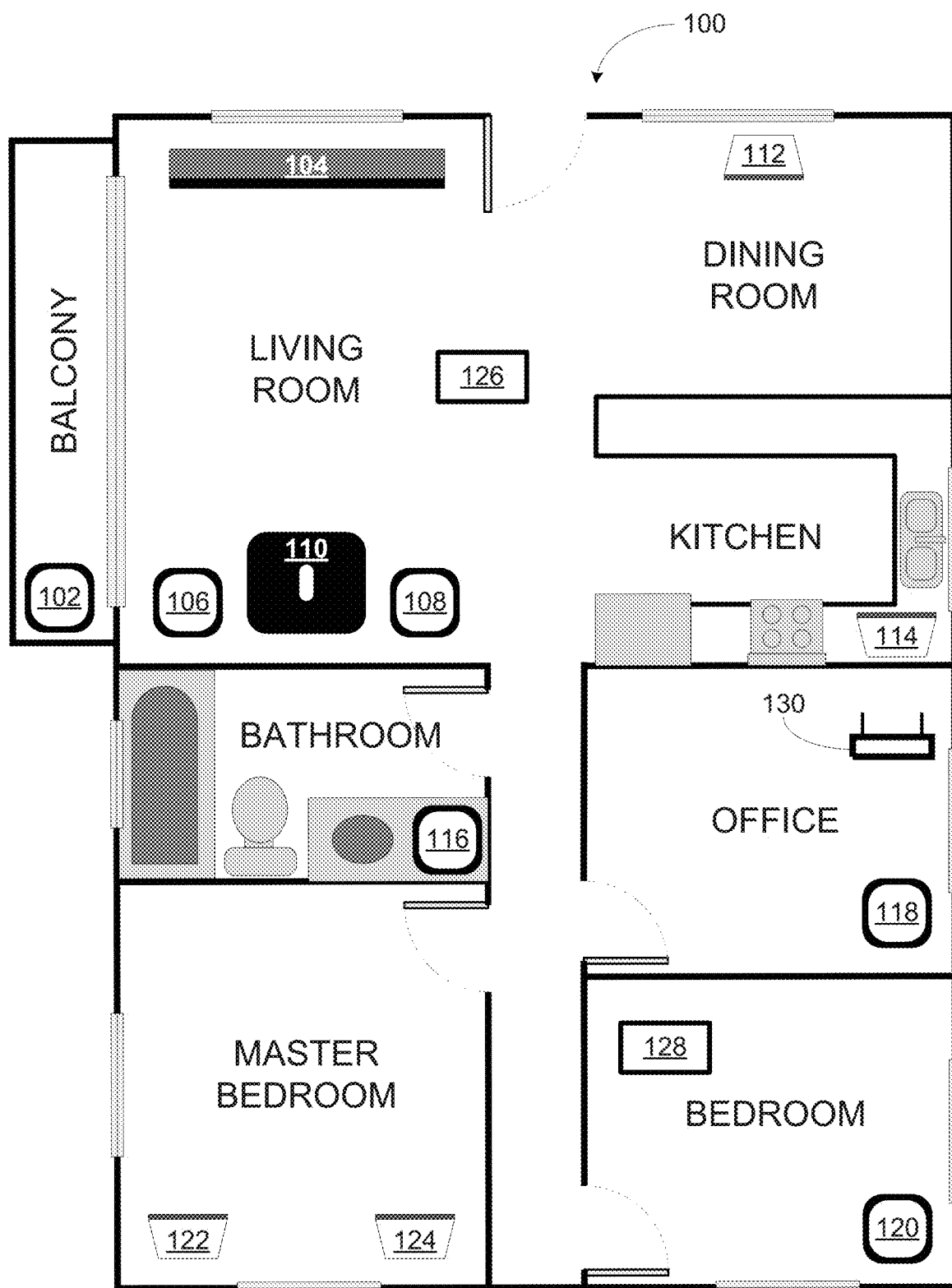
FIG. 1 shows an example media playback system configuration in which certain embodiments may be practiced.

Turning now to the drawings, seamlessly joining sides of a speaker enclosure in accordance with embodiments of the invention are described. Some embodiments described herein involve injection moulding a second side to contact a first side and an interior substructure element. Additional embodiments form an interlocking joint with the interior substructure element. In several embodiments, the first side is a speaker grill element at the front of the speaker enclosure having holes or openings through its front surface. In some embodiments, the second side is an injection moulded top side of the speaker enclosure and can be a load bearing side. Processes for joining sides in accordance with embodiments of the invention create a strong, resilient joint by the interface of three elements. Further embodiments include refining the outside surface to reduce or minimize the appearance of a seam at the joint.

In one embodiment, a method for joining sides of a speaker enclosure while minimizing the appearance of a seam in the joint is provided. The method involves affixing a speaker grill element to a substructure element, where the speaker grill element has a depth dimension that is shorter than its length and width dimensions, includes a first surface and a second surface that are substantially parallel to each other, and includes hole openings between the first surface and the second surface, where the substructure element has a depth dimension that is shorter than its length and width dimensions, includes protrusions above its front surface, and includes openings that are larger than the hole openings in the speaker grill element, and where the speaker grill element is aligned lengthwise to a first plane, inserting the joined speaker grill element and substructure element into a mould, where, in combination with portions of the speaker grill element and the substructure element, a surface of the mould forms a mould cavity for injection moulding a side element, and injecting molten plastic into the mould cavity to form an injection moulded side element.

A further embodiment also includes creating the speaker grill element of a plastic material.

Another embodiment also includes creating the substructure element of a plastic material.

In a still further embodiment, at least a portion of the substructure element is curved and the method also includes bending the speaker grill element to conform to the substructure element.

In still another embodiment, the bending of the speaker grill element is performed simultaneously with affixing the speaker grill element to the substructure element.

In a yet further embodiment, affixing the speaker grill element to the substructure element includes applying an adhesive between the speaker grill element and the substructure element and applying pressure to hold the speaker grill element to the substructure element maintaining contact at the protrusions of the substructure element.

In yet another embodiment, the protrusions of the substructure element rise from the outer surface of the substructure element a height in the range of 0.1 mm to 0.5 mm to allow room for adhesive materials.

In a further embodiment again, the protrusions of the substructure element rise 0.3 mm from the outer surface of the substructure element.

Another embodiment again also includes forming the substructure element with an undercut such that after assembly the injection moulded side element is prevented from being pulled away from the substructure element.

A further additional embodiment also includes forming the speaker grill element with alignment protrusions that correspond with receiving recesses in the mould.

Another additional embodiment also includes applying pressure to the substructure element in a direction orthogonal to the first plane.

A still yet further embodiment also includes applying pressure to the injected plastic material in a direction orthogonal to the first plane.

Still yet another embodiment also includes filling recesses in the outer surface of the injection moulded side element and speaker grill element, and removing excess material so that the surface in the area of the joint is flat.

A still further embodiment again also includes forming a speaker grill element that has a depth dimension that is shorter than its length and width dimensions, includes a first surface and a second surface that are substantially parallel to each other, and includes hole openings between the first surface and the second surface.

Still another embodiment again also includes forming a substructure element that has a depth dimension that is shorter than its length and width dimensions, includes protrusions above its front surface, and includes openings that are larger than the hole openings in the speaker grill element.

In a still further additional embodiment, an automated assembly system for joining sides of a speaker enclosure while minimizing the appearance of a seam in the joint is configured by processor instructions to affix a speaker grill element to a substructure element, where the speaker grill element has a depth dimension that is shorter than its length and width dimensions, includes a first surface and a second surface that are substantially parallel to each other, and includes hole openings between the first surface and the second surface, where the substructure element has a depth dimension that is shorter than its length and width dimensions, includes protrusions above its front surface, and includes openings that are larger than the hole openings in the speaker grill element, and where the speaker grill element is aligned lengthwise to a first plane, insert the joined speaker grill element and substructure element into a mould, where in combination with portions of the speaker grill element and the substructure element, a surface of the mould forms a mould cavity for injection moulding a side element, and inject molten plastic into the mould cavity to form an injection moulded side element.

Described below is an example operating environment for media playback systems that may utilize a speaker enclosure assembled in accordance with embodiments of the invention. Following the discussion are systems and processes for seamlessly joining sides of a speaker enclosure that can be used to house a playback device or other devices in a media playback system in accordance with embodiments of the invention.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
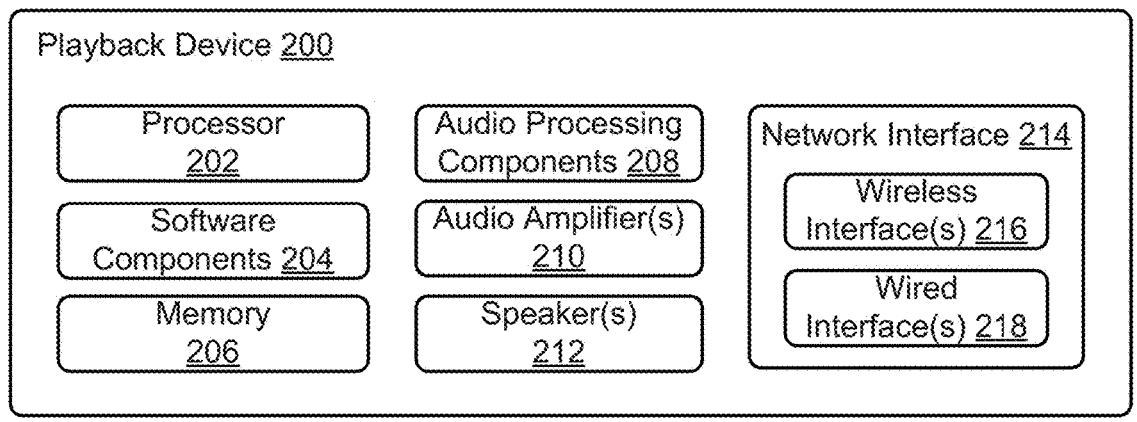
FIG. 2 shows a functional block diagram of an example playback device in accordance with embodiments of the invention.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

Figure 2A:
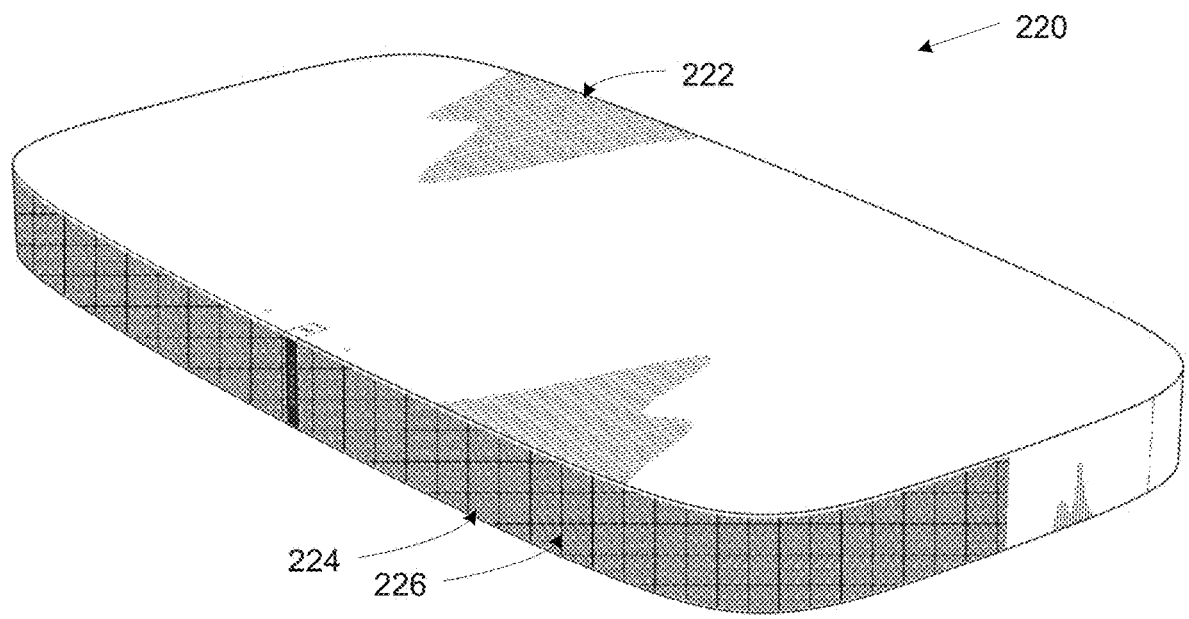
FIG. 2A illustrates a speaker enclosure that can be used to house a playback device in accordance with embodiments of the invention from a perspective view.
Figure 2B:
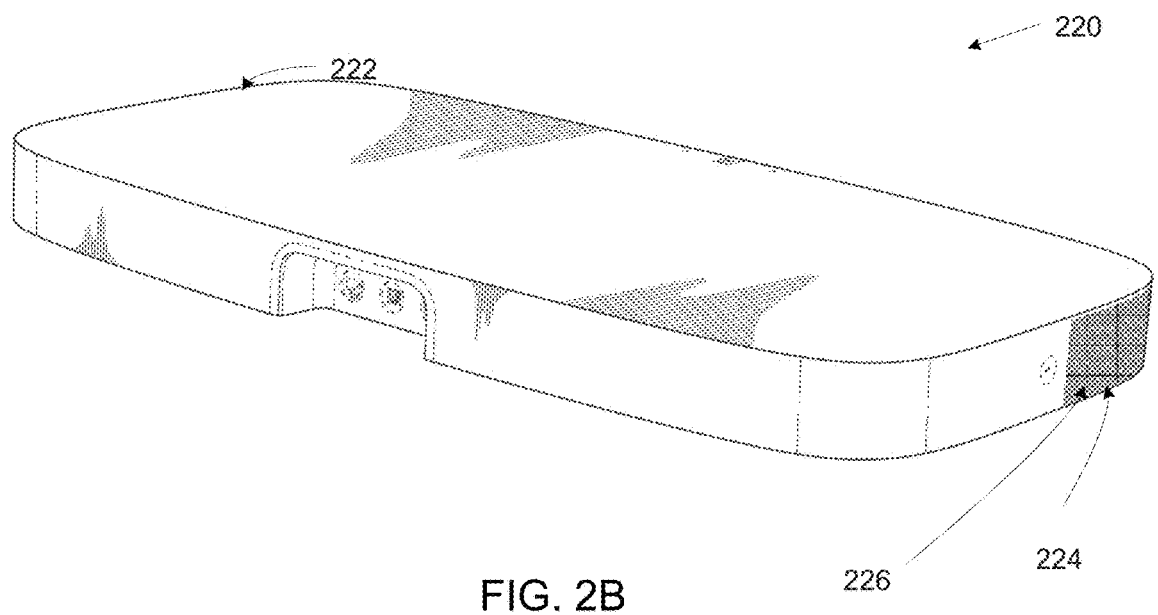
FIG. 2B illustrates a speaker enclosure that can be used to house a playback device in accordance with embodiments of the invention from another perspective view.
Figure 2C:
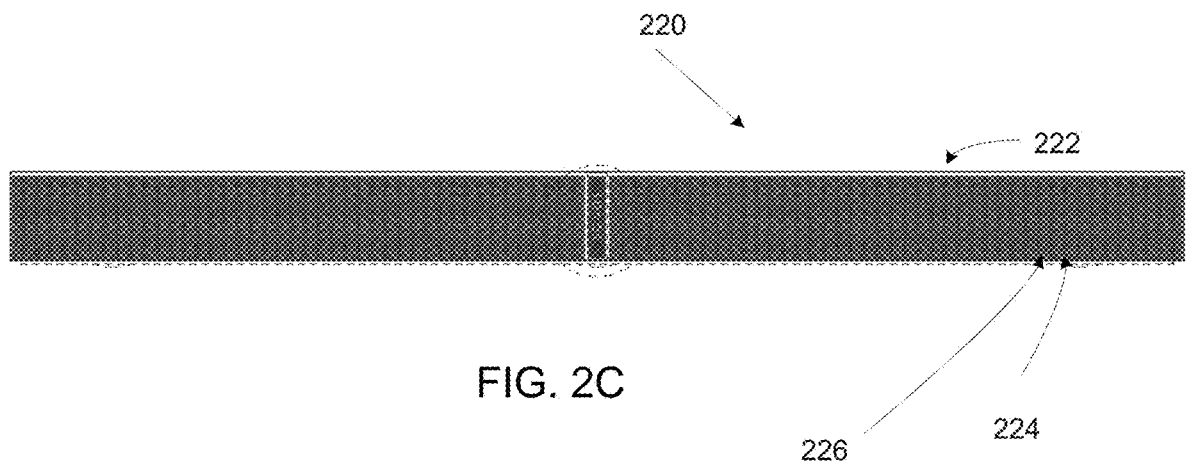
FIG. 2C illustrates a speaker enclosure that can be used to house a playback device in accordance with embodiments of the invention from a front view.

FIG. 2A illustrates a perspective view of a speaker enclosure 220 that houses a playback device in accordance with some embodiments of the invention. The processes described further below for seamlessly joining sides of a speaker enclosure may be used such as by injection moulding the top side 222 of the enclosure with the speaker grill element 224 across the front of the enclosure and a substructure element 226 behind the speaker grill element. FIG. 2B illustrates another perspective view and FIG. 2C illustrates a front view of the speaker enclosure 220.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
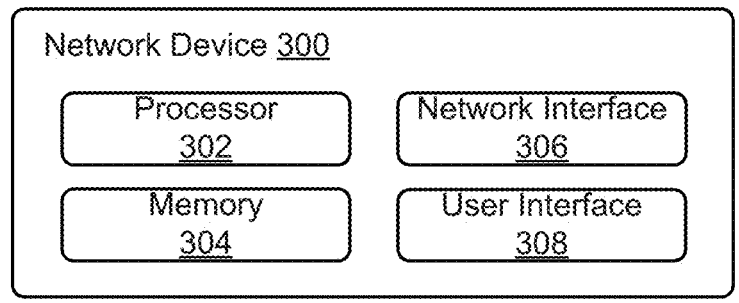
FIG. 3 shows a functional block diagram of an example control device in accordance with embodiments of the invention.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™)

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
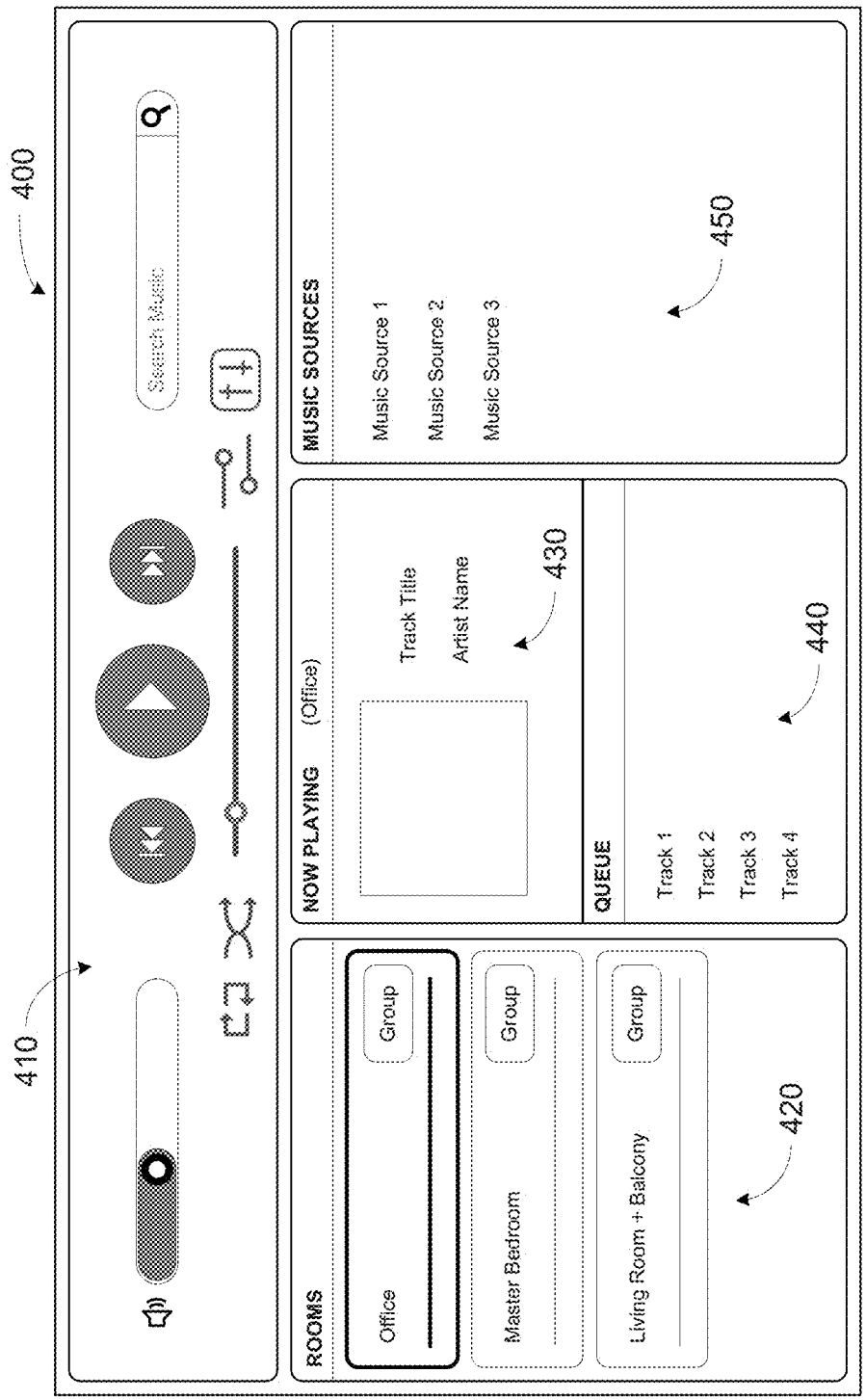
FIG. 4 shows an example controller interface in accordance with embodiments of the invention.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

Speaker Enclosure Components

A joint where two sides of a speaker enclosure are joined according to various embodiments of the invention involves three or more components including: a speaker grill element, a substructure element, and an injection moulded side element. Each component may be made of any of a variety of materials. Often, being made of similar materials can aid in attaching or bonding the components together. In many embodiments, one or more enclosure components are formed of a plastic or thermoplastic material. In various embodiments, metals or other materials may be used for enclosure components as appropriate to a particular application.

Figure 5A:
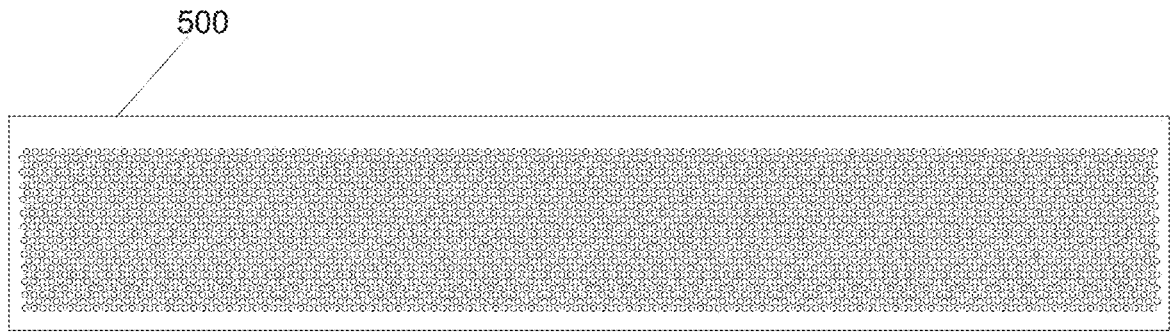
FIG. 5A is a front or outer view of a speaker grill element for seamlessly joining sides of a speaker enclosure in accordance with embodiments of the invention.
Figure 5B:
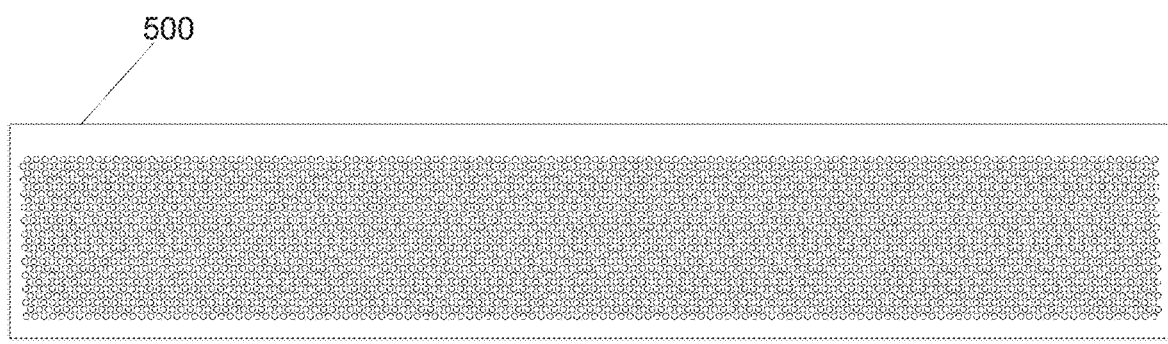
FIG. 5B is a rear or inner view of a speaker grill element for seamlessly joining sides of a speaker enclosure in accordance with embodiments of the invention.
Figure 5C:
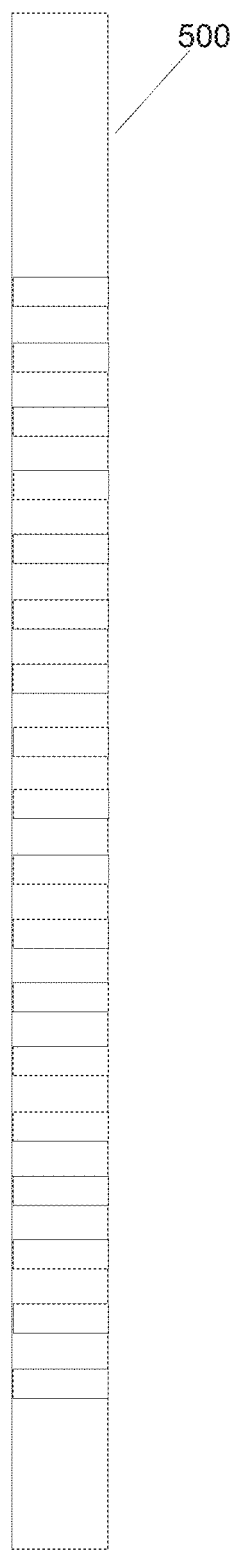
FIG. 5C is a cross sectional view of a speaker grill element for seamlessly joining sides of a speaker enclosure in accordance with embodiments of the invention.

In many embodiments, a speaker grill element is attached to form at least part of a side of the speaker enclosure and covers speaker drivers within the enclosure. The speaker grill element typically has at least a portion that is acoustically transparent or allows sound to pass through from the drivers into the environment. A speaker grill element can be flat or curved. In many embodiments, a speaker grill element includes an outer planar surface and an inner planar surface that are substantially parallel. A speaker grill element in accordance with several embodiments of the invention is illustrated with a frontal view of the outer surface in FIG. 5A. A rear view of the inner surface is provided in FIG. 5B and a cross sectional side profile view is provided in FIG. 5C. The speaker grill element 500 is illustrated separate from an enclosure for visibility and includes small holes that can be drilled, pressed, or otherwise formed. In other embodiments of the invention, the speaker grill element can have larger holes that are covered with fabric or other material and/or can have attachment points for mounting additional covering. Although a specific speaker grill element is illustrated in FIGS. 5A-5C, one skilled in the art will recognize that the size and shape of a speaker grill element and the size and shape of holes or openings may be varied in accordance with different embodiments of the invention as appropriate to a particular application.

Figure 6A:
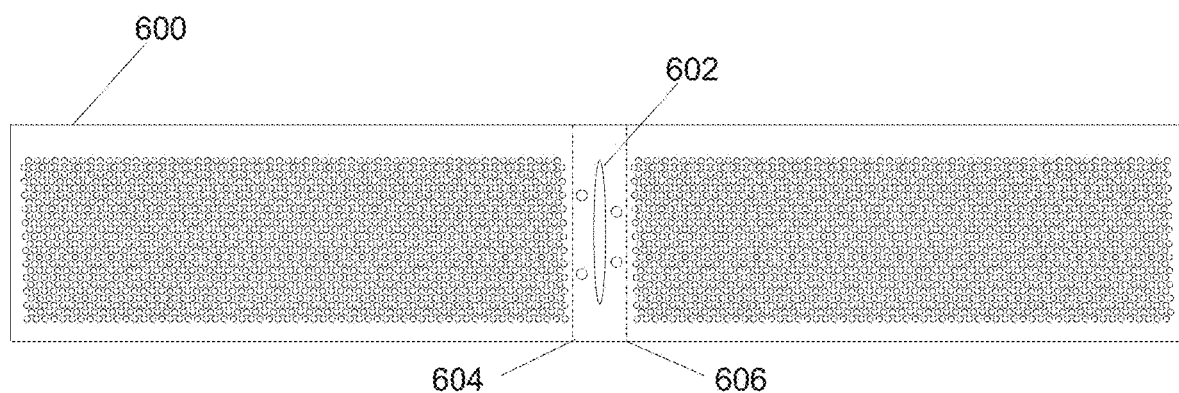
FIG. 6A is a front or outer view of a speaker grill element having alignment protrusions for seamlessly joining sides of a speaker enclosure in accordance with embodiments of the invention.
Figure 6B:
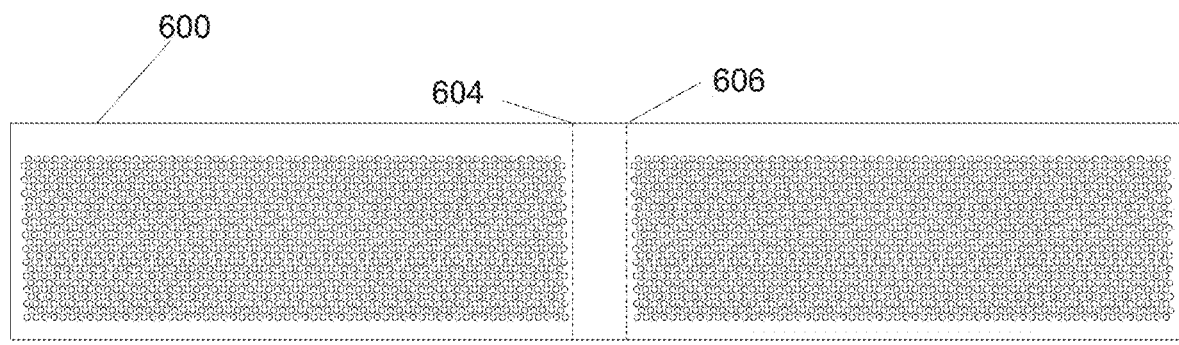
FIG. 6B is a rear or inner view of a speaker grill element having alignment protrusions for seamlessly joining sides of a speaker enclosure in accordance with embodiments of the invention.
Figure 6C:
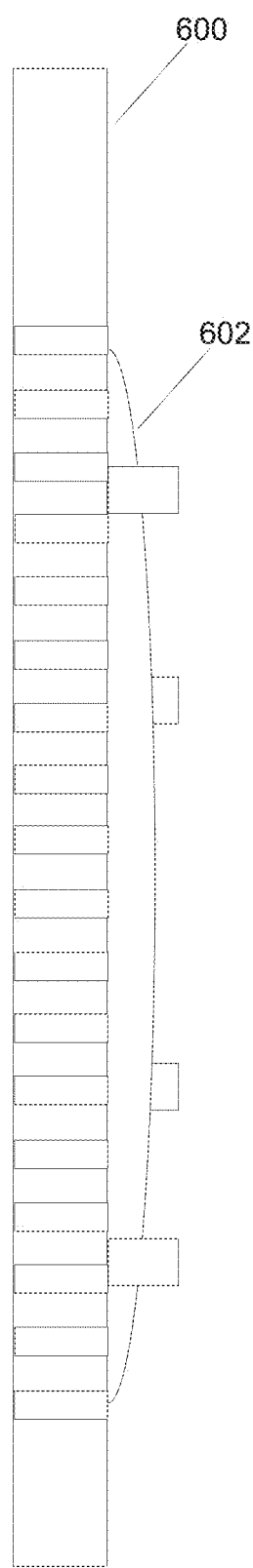
FIG. 6C is a cross sectional view of a speaker grill element having alignment protrusions for seamlessly joining sides of a speaker enclosure in accordance with embodiments of the invention.

A speaker grill element in accordance with further embodiments of the invention is illustrated with a frontal view of the outer surface in FIG. 6A. A rear view of the inner surface is provided in FIG. 6B and a cross sectional side profile view is provided in FIG. 6C. The speaker grill element 600 is illustrated separate from an enclosure for visibility. The speaker grill element 600 includes alignment protrusions 602 that can be used to align the speaker grill element into a mould by engaging with matching receiving recesses in the mould. In various embodiments, alignment protrusions may have different tolerances based on tolerance requirements as appropriate to the particular application. After the injection mould process is complete and the assembly is removed from the mould, the section containing the alignment protrusions can be cut away along dashed lines 604 and 606. The particular arrangement of alignment protrusions 602 illustrated in FIGS. 6A-6C include a rib across the short dimension of the speaker grill element 600 and pairs of posts on opposite sides of the rib where each post is offset from the opposing post on the other side of the rib. This asymmetric arrangement can ensure correct orientation and alignment within the mould, so that the speaker grill element 600 cannot be placed in backwards or out of alignment in the mould. Although a specific speaker grill element is illustrated in FIGS. 6A-6C, one skilled in the art would recognize that other asymmetric shapes and/or patterns may be utilized for orienting and aligning a speaker grill element within a mould in accordance with embodiments of the invention.

Figure 7A:
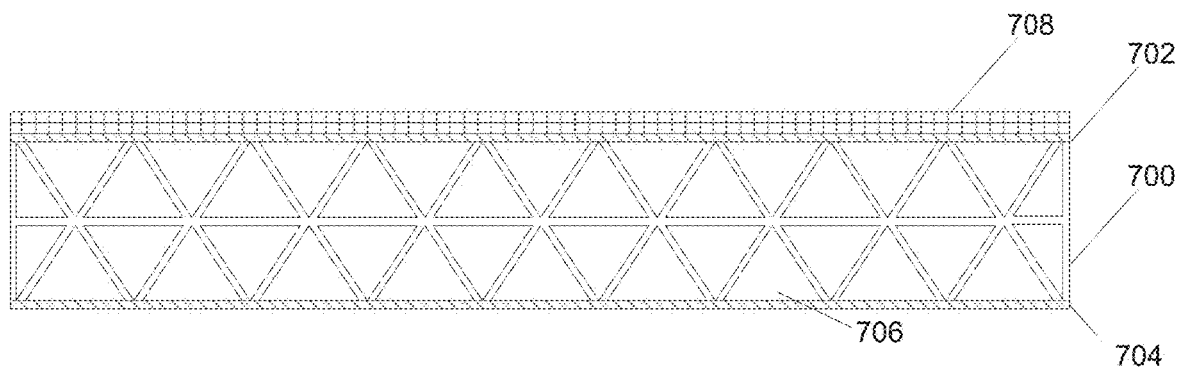
FIG. 7A is a front or outer view of a substructure element having an undercut for seamlessly joining sides of a speaker enclosure in accordance with embodiments of the invention.
Figure 7B:
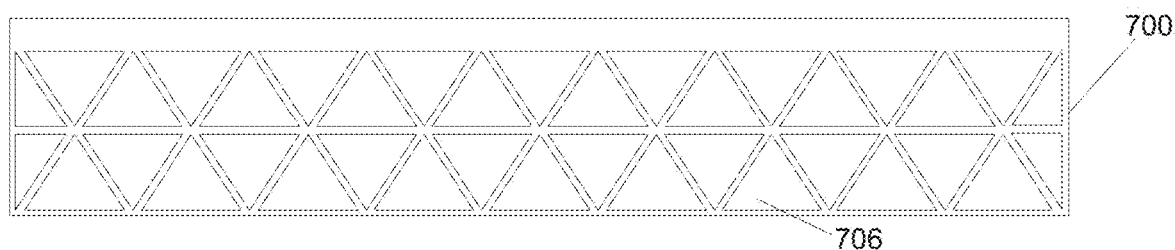
FIG. 7B is a rear or inner view of a substructure element having an undercut for seamlessly joining sides of a speaker enclosure in accordance with embodiments of the invention.
Figure 7C:
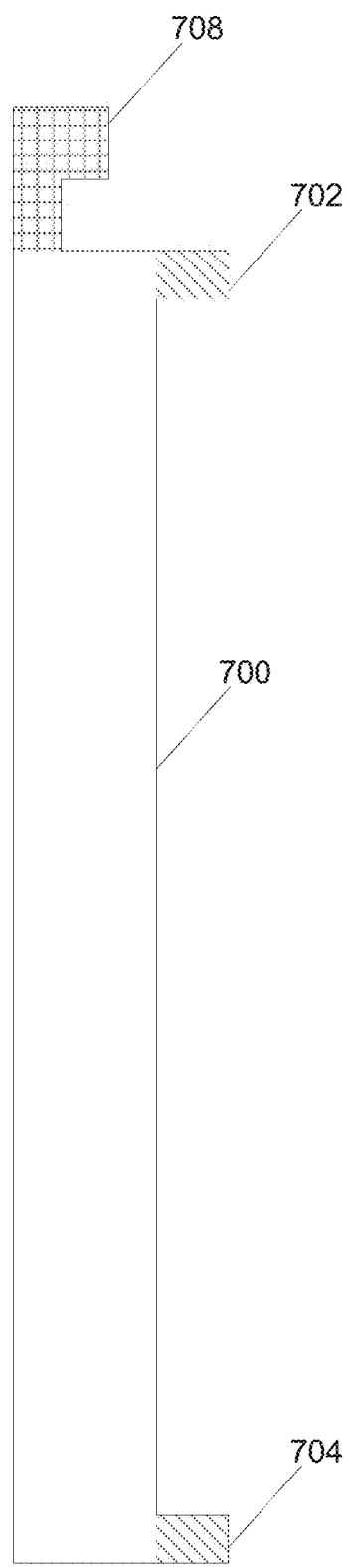
FIG. 7C is a cross sectional view of a substructure element having an undercut for seamlessly joining sides of a speaker enclosure in accordance with embodiments of the invention.

A substructure element is attached to the speaker grill element and can provide reinforcement. The pieces can be attached using an adhesive or other type of permanent binding mechanism appropriate to the materials the pieces are made of, such as ultrasonic welding. In several embodiments, the substructure element provides an interior frame structure for the speaker grill element to be joined to and allows sound generated by speaker drivers within the speaker enclosure to pass through relatively unimpeded. A substructure element in accordance with several embodiments of the invention is illustrated with a frontal view of the outer surface in FIG. 7A. A rear view of the inner surface is provided in FIG. 7B and a cross sectional side profile view is provided in FIG. 7C. The illustrated substructure element 700 includes large triangular openings 706 through the inner surface to the outer surface. One skilled in the art would recognize that any of a variety of shapes and arrangements of openings may be utilized in various embodiments of the invention.

The side of the substructure element 700 that faces a speaker grill element includes one or more protrusions (highlighted by diagonally hatched lines) 702 and 704 that contact the inner surface of the speaker grill element. The protrusions 702 and 704 contact the inner surface of the speaker grill element and provide a space between the substructure element and the speaker grill element in which adhesive can be placed to join the two pieces. In several embodiments, one or more of the protrusions also act to prevent molten plastic material from reaching the holes of the speaker grill element when the injection moulded side element is formed into the joint. In the injection moulding process, pressure may be applied to a substructure element pressing it against a speaker grill element at upwards of hundreds of newtons of force. The protrusions of the substructure element in accordance with several embodiments of the invention should be sized in combination with the thickness and elasticity of adhesive placed in between the two pieces to withstand the pressure and to allow slight compression without crushing of the protrusions. In further embodiments, the thickness of the adhesive is a minimum amount that provides for an adequate bond.

While the illustrated example shows two parallel lengthwise protrusions 702 and 704 along opposite edges of the substructure element, one skilled in the art would recognize that the protrusions can be located in different places along the substructure element in accordance with embodiments of the invention. In some embodiments, the protrusions rise 0.3 mm from the outer surface of the substructure element providing a 0.3 mm deep space for adhesive materials. In further embodiments, the 0.3 mm rise is constructed with a 0.05 mm tolerance. Other heights of protrusions are also possible. Various embodiments may utilize protrusions having a height in the range of 0.1 mm to 0.5 mm. Precision of the protrusions may vary based on tolerance requirements.

Furthermore, one side of the substructure element 700 includes an undercut (highlighted by checkered hatched lines) 708 that forms part of a mould cavity with the adjacent inner surface of the speaker grill housing. In many embodiments, the undercut 708 is adjacent to at least one of the protrusions 702 or 704. An injection moulded side element can be formed by filling the mould cavity with molten plastic material that molds to the undercut and the adjacent portion of the speaker grill element. As will be shown and discussed further below, when the injection moulded side element is molded to the substructure element, the contacting portions of the two interlock, preventing the joint from being pulled apart.

Figure 7D:
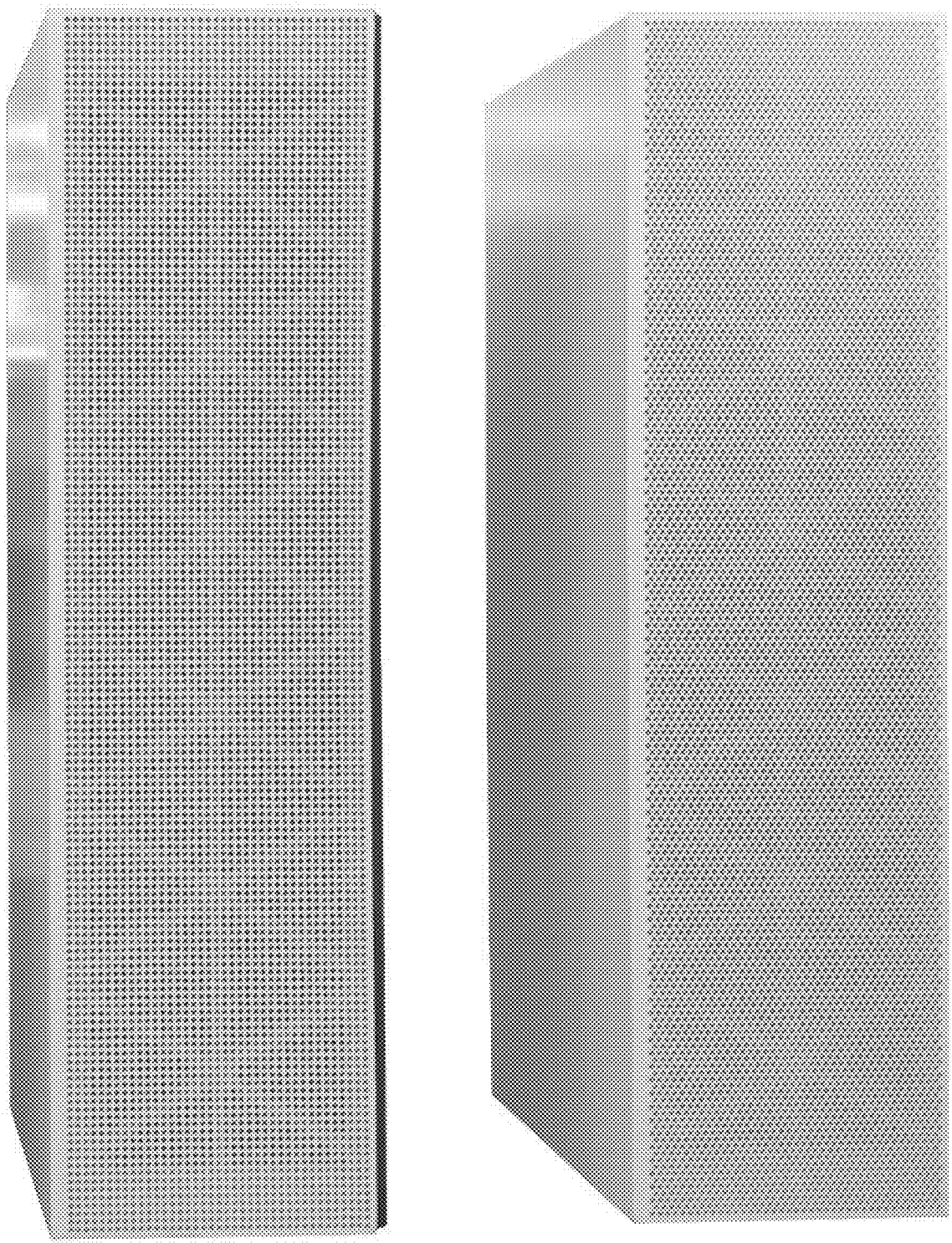
Figure 8A:
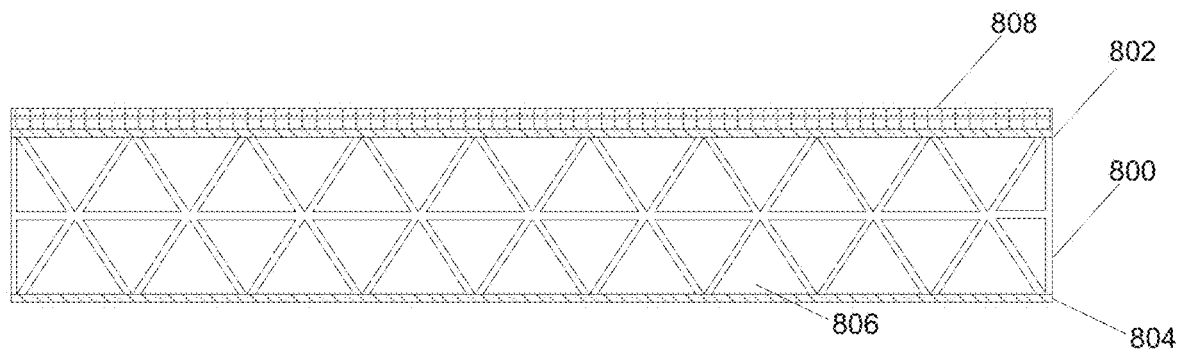
FIG. 8A is a front or outer view of a substructure element for seamlessly joining sides of a speaker enclosure in accordance with embodiments of the invention.
Figure 8B:
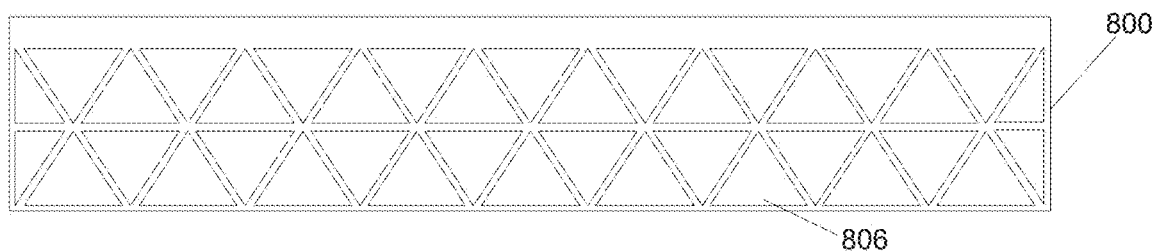
FIG. 8B is a rear or inner view of a substructure element for seamlessly joining sides of a speaker enclosure in accordance with embodiments of the invention.
Figure 8C:
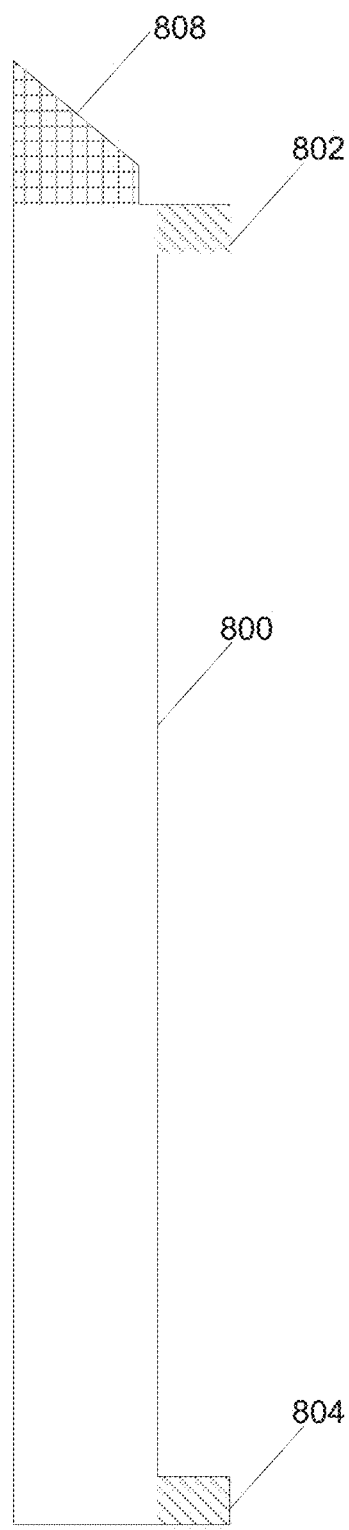
FIG. 8C is a cross sectional view of a substructure element for seamlessly joining sides of a speaker enclosure in accordance with embodiments of the invention.

An image illustrating the shape for an example substructure element seen behind a speaker grill element is shown in FIG. 7D. Substructure elements in accordance with embodiments of the invention may utilize different shapes on the surfaces that engage with the speaker grill element and injection moulded side element. Further embodiments of the invention utilize a substructure element as illustrated in FIGS. 8A-8C. The illustrated substructure element 800 similarly includes protrusions 802 and 804 (highlighted by diagonally hatched lines) and openings 806. Along one side adjacent to protrusion 802, the substructure element 800 includes a tapered edge 808 (highlighted by checkered hatched lines) that acts as a portion of a mould cavity for an injection moulded side element and a surface for the injection moulded side element to be formed to. Although specific substructure elements are illustrated in FIGS. 7A-7C and 8A-8C, one skilled in the art will recognize that any of a variety of sizes and shapes may be utilized in accordance with embodiments of the invention.

The injection moulded side element can be formed to the joined speaker grill element and substructure element by injection moulding. The three-way joint provides strength and rigidity to the structure. In several embodiments, the injection moulded side element is a load bearing side such as forming the top face of the speaker enclosure. Processes for forming a three-way joint and minimizing the appearance of a seam in accordance with embodiments of the invention are discussed below.

Processes for Seamlessly Joining Sides of a Speaker Enclosure

Using the components discussed above, a manufacturing process can be performed to assemble at least part of a speaker enclosure with a robust joint between sides while minimizing the appearance of a seam between the sides. In many embodiments of the invention, a computerized machine executes or is configured to execute processor instructions that direct the machine to perform a process for joining sides of a speaker enclosure. In other embodiments, the process can be performed manually.

Figure 9:
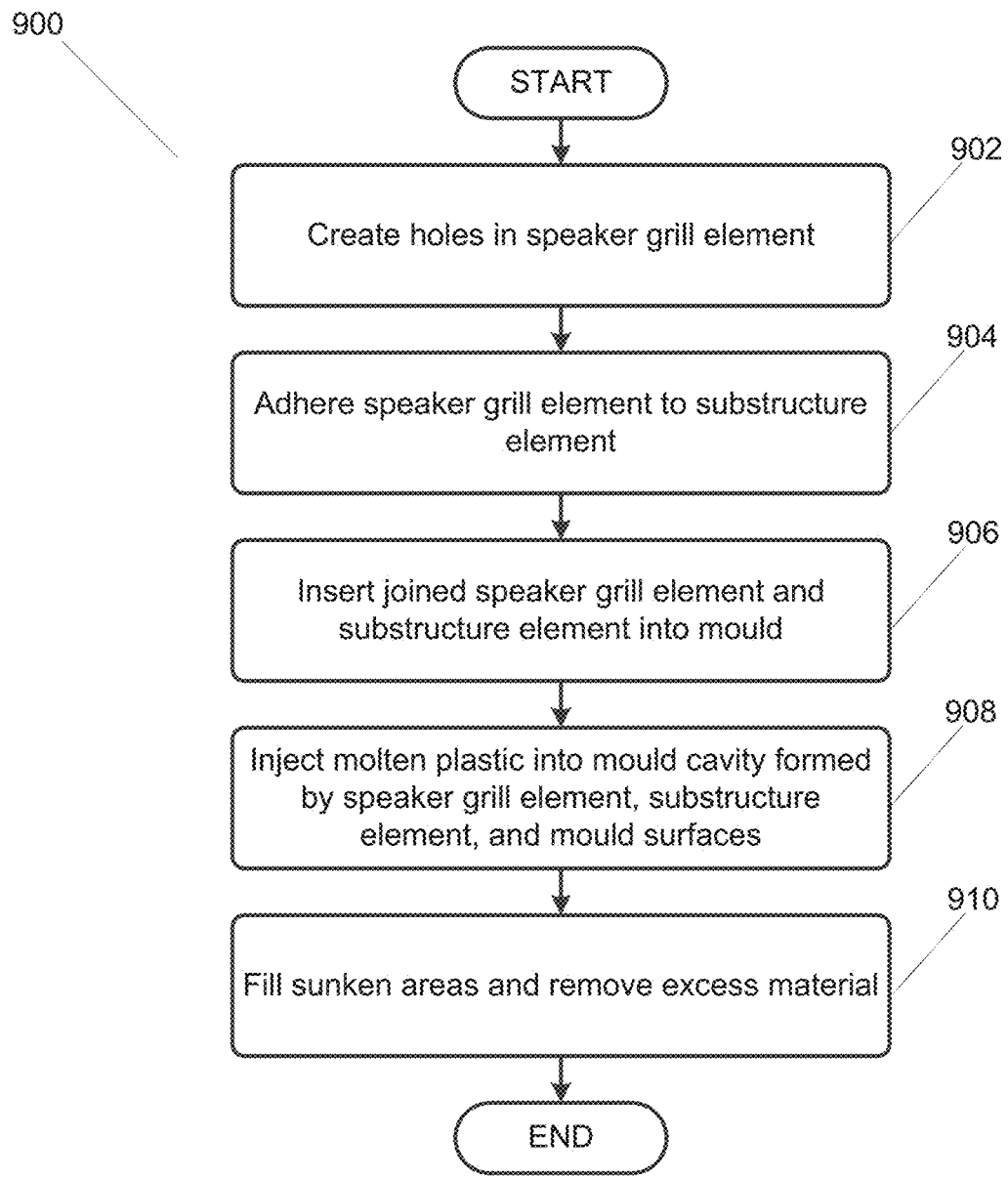
FIG. 9 is a flow diagram showing a process for seamlessly joining sides of a speaker enclosure in accordance with embodiments of the invention.

Method 900 shown in FIG. 9 presents an embodiment of a method that can be implemented to manufacture at least a portion of a speaker enclosure involving, for example, the components discussed above. Method 900 may include one or more operations, functions, or actions as illustrated by one or more of blocks 902-910. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

The process 900 may include preparing the speaker grill element by creating holes or openings in the speaker grill element. In several embodiments, holes are drilled (902) orthogonally through the speaker grill element from one surface to the other surface. In further embodiments, the holes are evenly spaced across a significant portion of the speaker grill element. In many embodiments, holes are not placed in areas that the substructure element and/or the injected moulded side element will contact. In some embodiments where the final shape is curved or otherwise not flat, the holes are drilled while the speaker grill element is flat and before it is bent or moulded into shape. The speaker grill element can then be bent or moulded into a shape that substantially conforms to the substructure element. In other embodiments, holes are drilled after the speaker grill element is bent, machined, or moulded into shape. In additional embodiments, holes are not drilled but may be pressed or cut or formed by other machining techniques before or after shaping.

The speaker grill element is affixed (904) to the substructure element. The joining can utilize a heat sensitive adhesive, ultrasonic welding, or other appropriate technique for joining the materials together. The two are joined so that the protrusions of the substructure element contact the inner surface of the speaker grill element. In embodiments utilizing an adhesive, the adhesive fills the space created by the protrusions spacing the remaining surface of the substructure element away from the speaker grill element. In several embodiments, joining the speaker grill element and the substructure element may be performed while bending the speaker grill element to conform to the substructure element.

Figure 10A:
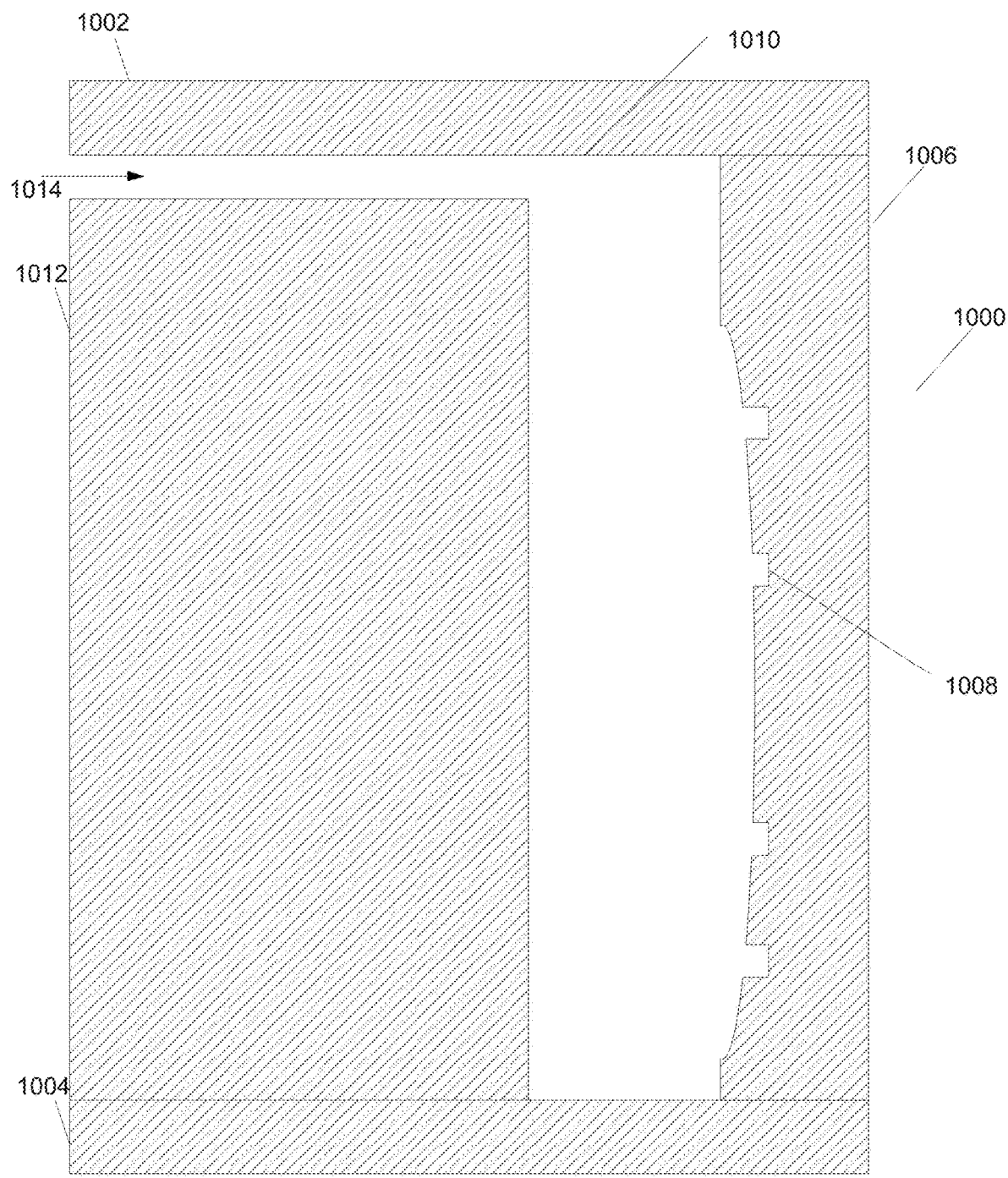
FIG. 10A is a cross sectional view of a mould for seamlessly joining sides of a speaker enclosure in accordance with embodiments of the invention.
Figure 10B:
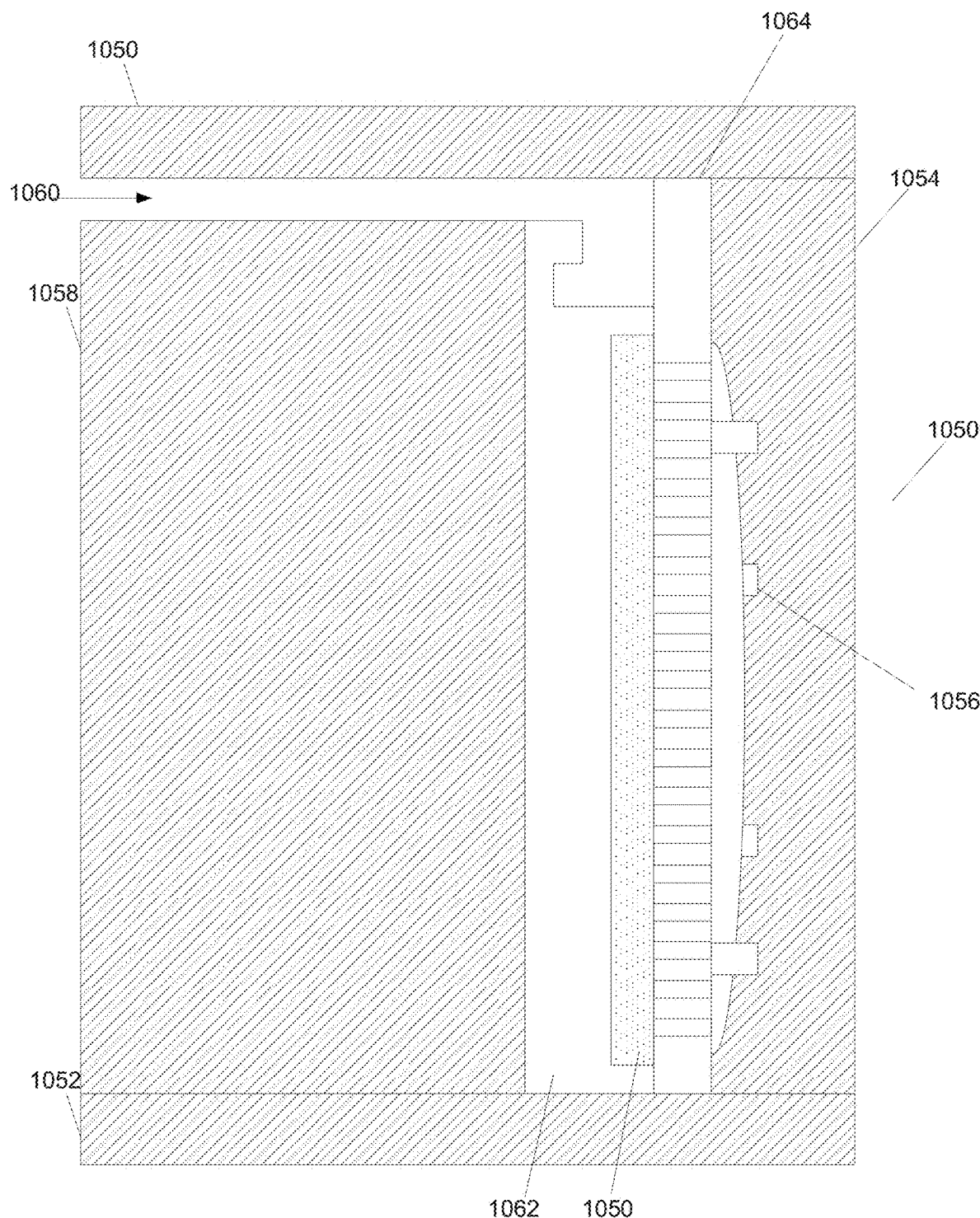
FIG. 10B is a cross sectional view of a mould for seamlessly joining sides of a speaker enclosure and a joined speaker grill element and substructure element inserted into the mould.

The joined speaker grill element and substructure element are placed (906) into a mould. A mould assembly 1000 that may be utilized in accordance with certain embodiments of the invention illustrated in FIG. 10A. The mould assembly 1000 includes opposing mould sides 1002 and 1004 and forward mould side 1006. A mould assembly 1050 with a joined speaker grill element 1064 and substructure element 1062 with adhesive 1066 placed inside is illustrated in FIG. 10B. In several embodiments, the speaker grill element includes a ridge and/or posts, such as shown in the example illustrated in FIGS. 6A and 6C, protruding out from its outer surface that can be utilized to align the joined pieces in the mould via receiving recesses 1008 in forward mould side 1006. In some embodiments, the posts are offset in an asymmetric pattern so that the speaker grill element can only be placed in the mould in a single orientation. The mould holds the outer surface of the speaker grill element and provides a mould surface 1010 from the edge of the speaker grill element rearward. A moveable portion of the mould 1012 holds or applies pressure to the inner surface of the substructure element and provides a second mould surface from the rear edge of the substructure element rearward. Between the first and second mould surfaces, portions of the rear surface of the speaker grill element and a side surface of the substructure element having an undercut form part of the mould cavity. In many embodiments, the first and second mould surfaces and portions of the rear surface of the speaker grill element and side surface of the substructure element form the complete mould cavity. An opening 1014, such as a sprue or gate, allows for molten plastic material to enter the mould cavity.

Molten plastic material is injected (908) into the mould cavity until the plastic material fills the cavity. The injected plastic bonds to the surfaces of the speaker grill element and substructure element that form part of the mould cavity. In many embodiments, a holding pressure is maintained to compensate for any material shrinkage. In several embodiments, the plastic material and/or holding pressure are applied from the rear of the mould to the front side of the mould where the speaker grill element is held. Applying pressure in this direction can strengthen the bond of the plastic material to the portions of the surfaces of the speaker grill element and/or the substructure element that it contacts. In many embodiments, protrusions of the substructure element prevent molten plastic material from reaching the holes of the speaker grill element.

After the injected plastic solidifies, there may be sunken areas where the material has contracted, such as the injected plastic material meets the speaker grill element. The concave areas can be filled (910) with additional plastic material and any excess removed to leave a flat and smooth surface. The excess may be removed by sanding, filing, or other appropriate techniques. Although a specific process is discussed above with respect to FIG. 9, one skilled in the art will recognize that any of a variety of processes may be performed to join sides of a speaker enclosure in accordance with embodiments of the invention. Processes according to various embodiments of the invention may utilize any of a variety of materials for the speaker grill element, the substructure element, and/or the moulded side element. As discussed further above, appropriate materials can include different types of plastics, metals, and other materials. One skilled in the art would appreciate that metals may be used for injection moulding in processes similar to that discussed above and different components may be made of different materials that can be moulded or joined together.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Although the description above contains many specificities, these should not be construed as limiting the scope of the invention but as merely providing illustrations of some of the presently preferred embodiments of the invention. Various other embodiments are possible within its scope. The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

What is claimed is:

1. A method for joining sides of a speaker enclosure while minimizing the appearance of a seam between the joined sides, the method including:
affixing a speaker grill element to a substructure element;
where the speaker grill element has a depth dimension that is shorter than its length and width dimensions, comprises a first surface and a second surface that are substantially parallel to each other, and comprises hole openings between the first surface and the second surface;
where the substructure element has a depth dimension that is shorter than its length and width dimensions, comprises an undercut facing the direction in which the speaker grill element affixes, comprises protrusions above its front surface, and comprises openings that are larger than the hole openings in the speaker grill element; and
where the speaker grill element is aligned lengthwise to a first plane;
inserting the joined speaker grill element and substructure element into a mould, where, in combination with portions of the speaker grill element and the substructure element including the undercut, a surface of the mould forms a mould cavity for injection moulding a side element; and
injecting molten plastic into the mould cavity that bonds to surfaces of the speaker grill element and undercut of the substructure element to form an injection moulded side element that interlocks with the undercut of the substructure element.

2. The method of claim 1, further comprising creating the speaker grill element of a plastic material.

3. The method of claim 1, further comprising creating the substructure element of a plastic material.

4. The method of claim 1, wherein at least a portion of the substructure element is curved and the method further comprises bending the speaker grill element to conform to the substructure element.

5. The method of claim 4, wherein the bending of the speaker grill element is performed simultaneously with affixing the speaker grill element to the substructure element.

6. The method of claim 1, wherein affixing the speaker grill element to the substructure element comprises applying an adhesive between the speaker grill element and the substructure element and applying pressure to hold the speaker grill element to the substructure element maintaining contact at the protrusions of the substructure element.

7. The method of claim 1, wherein the protrusions of the substructure element rise from the outer surface of the substructure element a height in the range of 0.1 mm to 0.5 mm to allow room for adhesive materials.

8. The method of claim 7, wherein the protrusions of the substructure element rise 0.3 mm from the outer surface of the substructure element.

9. The method of claim 1, further comprising forming the substructure element with the undercut such that after assembly the injection moulded side element is prevented from being pulled away from the substructure element.

10. The method of claim 1, further comprising forming the speaker grill element with alignment protrusions that correspond with receiving recesses in the mould.

11. The method of claim 1, further comprising applying pressure to the substructure element in a direction orthogonal to the first plane and towards the speaker grill element while injecting the molten plastic.

12. The method of claim 1, further comprising applying pressure to the injected plastic material in a direction orthogonal to the first plane and towards the speaker grill element while injecting the molten plastic.

13. The method of claim 1, further comprising filling recesses in the outer surface of the injection moulded side element and speaker grill element, and removing excess material so that the surface in the area where the injection moulded side element and speaker grill element are joined is flat.

14. The method of claim 1, further comprising forming the speaker grill element that has a depth dimension that is shorter than its length and width dimensions, comprises a first surface and a second surface that are substantially parallel to each other, and comprises hole openings between the first surface and the second surface.

15. The method of claim 1, further comprising forming the substructure element that has a depth dimension that is shorter than its length and width dimensions, includes protrusions above its front surface, and includes openings that are larger than the hole openings in the speaker grill element.

* * * * *